United States Patent
Qiu et al.

(10) Patent No.: US 11,343,787 B2
(45) Date of Patent: May 24, 2022

(54) METHOD AND SYSTEM FOR PROCESSING NODE REGISTRATION NOTIFICATION

(71) Applicant: GUANGZHOU BAIGUOYUAN NETWORK TECHNOLOGY CO., LTD., Guangzhou (CN)

(72) Inventors: Guanghai Qiu, Guangzhou (CN); Fengming Liu, Guangzhou (CN); Jizhang Gong, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 159 days.

(21) Appl. No.: 16/336,682

(22) PCT Filed: Sep. 25, 2017

(86) PCT No.: PCT/CN2017/103207
§ 371 (c)(1),
(2) Date: Mar. 26, 2019

(87) PCT Pub. No.: WO2018/059354
PCT Pub. Date: Apr. 5, 2018

(65) Prior Publication Data
US 2020/0389863 A1    Dec. 10, 2020

(30) Foreign Application Priority Data
Sep. 28, 2016 (CN) .......................... 201610868265.2

(51) Int. Cl.
*H04W 60/00* (2009.01)
*H04L 12/26* (2006.01)
(Continued)

(52) U.S. Cl.
CPC ............. *H04W 60/00* (2013.01); *H04L 43/10* (2013.01); *H04W 56/00* (2013.01)

(58) Field of Classification Search
CPC ....... H04L 43/10; H04L 67/10; H04L 67/141; H04L 67/288; H04L 67/2885; H04W 56/00; H04W 60/00
See application file for complete search history.

(56) References Cited

U.S. PATENT DOCUMENTS 7,464,168 B1    12/2008  Abdelaziz et al.
8,391,296 B2 *   3/2013  Sailhan .................. H04L 41/06
                                                                370/400
(Continued)

FOREIGN PATENT DOCUMENTS

CN        101335724 A       12/2008
CN        101453730 A        6/2009
(Continued)

OTHER PUBLICATIONS

European search report of counterpart EP application No. 17854804.6 dated Sep. 17, 2019.
(Continued)

*Primary Examiner* — Liton Miah
(74) *Attorney, Agent, or Firm* — Dilworth & Barrese, LLP.; Michael J. Musella, Esq.

(57) ABSTRACT

The present disclosure relates to the field of mobile communication, and specifically, to a method and system for processing node registration notifications. The method is applicable in a distributed system comprising a forwarding router, a plurality of central nodes, and a plurality of serving nodes. Each of the central nodes is connected to the forwarding router and at least one of the serving nodes, respectively. The connecting line from one of the central nodes to the forwarding router and the connecting line from the central node to the serving node belong to the same operating network. The method and system of the present disclosure are adopted to reduce the impact on communi-
(Continued)

cation between different serving nodes in an operating network.

14 Claims, 5 Drawing Sheets

(51) Int. Cl.
*H04W 56/00* (2009.01)
*H04L 43/10* (2022.01)

(56) References Cited

U.S. PATENT DOCUMENTS

| | | | |
|---|---|---|---|
| 10,476,820 B2* | 11/2019 | Lair | H04L 67/303 |
| 11,064,370 B2* | 7/2021 | Fox | H04W 36/0033 |
| 11,212,140 B2* | 12/2021 | Mukundan | H04L 47/2408 |
| 2004/0063451 A1 | 4/2004 | Bonta et al. | |
| 2006/0271681 A1 | 11/2006 | Apreutesei et al. | |
| 2007/0294596 A1 | 12/2007 | Gissel et al. | |
| 2008/0270531 A1 | 10/2008 | Revanuru | |
| 2008/0285540 A1 | 11/2008 | Burckart et al. | |
| 2009/0154480 A1 | 6/2009 | Arai et al. | |
| 2010/0238874 A1* | 9/2010 | Haddad | H04W 60/005 |
| | | | 370/329 |
| 2011/0142044 A1* | 6/2011 | Csaszar | H04L 9/083 |
| | | | 370/390 |
| 2012/0239727 A1 | 9/2012 | Dutta et al. | |
| 2015/0120827 A1* | 4/2015 | Vuong | G16H 10/60 |
| | | | 709/204 |
| 2016/0182666 A1* | 6/2016 | Rathod | G06F 16/3331 |
| | | | 709/218 |
| 2016/0315912 A1* | 10/2016 | Mayya | H04L 63/0281 |
| 2016/0373303 A1* | 12/2016 | Vedam | H04L 43/10 |
| 2017/0164378 A1* | 6/2017 | Gunasekara | H04W 4/00 |
| 2018/0124050 A1* | 5/2018 | Sakamoto | H04L 63/0807 |

FOREIGN PATENT DOCUMENTS

| | | |
|---|---|---|
| CN | 101677324 A | 3/2010 |
| CN | 103051551 A | 4/2013 |
| CN | 105959349 A | 9/2016 |
| CN | 106453539 A | 2/2017 |
| RU | 2449498 C2 | 4/2012 |

OTHER PUBLICATIONS

International Search Report dated Dec. 29, 2017 from State Intellectual Property Office of the P.R. China.
Written Opinion of the International Searching Authority dated Dec. 29, 2017.
First Chinese Office Action dated Dec. 19, 2018.
Decision on grant a patent for invention of Russian application No. 2019110880 issued on Nov. 13, 2019.
Communication pursuant to Article 94(3) EPC of counterpart EP application No. 17854804.6 issued on Dec. 6, 2019.
Communication under Rule 71(3) EPC of counterpart EP application No. 17854804.6 issued on Jun. 4, 2020.

* cited by examiner

METHOD AND SYSTEM FOR PROCESSING NODE REGISTRATION NOTIFICATION

This application claims priority to Chinese Patent Application No. 201610868265.2, filed on Sep. 28, 2016 and titled "Method and system for processing node registration notice", the entire contents of which are incorporated herein by reference.

TECHNICAL FIELD

The present disclosure relates to the field of mobile communication, and in particular to a method and system for processing a node registration notification.

BACKGROUND

With the continuous development of network technology, there are more and more types of network services, and their functions are becoming more and more abundant. A service provider generally adopts a distributed system to build a service backend, that is, the service backend consists of a plurality of servers. A server is equivalent to a serving node in the distributed system, and each serving node generally provides a small number of functional services or a single functional service. In this way, after the service backend receives a service request involving a plurality of functional services, the serving nodes corresponding to respective functional services can communicate with each other and then jointly process the service request.

There is a central node for managing serving nodes in the distributed system. If a serving node needs to join the distributed system, it needs to be registered at the central node. Then, the central node can transmit the node information (such as ip (Internet Protocol) address, port number, etc.) of this serving node to other serving nodes, and meanwhile can transmit the node information of the other serving nodes to this serving node. Thus, this serving node and the other serving nodes can communicate according to the node information. In addition, when a serving node exits the distributed system, the central node can also notify other serving nodes, so that the other serving nodes no longer communicate with this serving node.

SUMMARY

In order to solve the problems of the prior art, the embodiments of the present disclosure provide a method and system for processing a node registration notification. The technical solutions are as follows.

In a first aspect, there is provided a method for processing a node registration notification. The method is applicable in a distributed system comprising a forwarding router, a plurality of central nodes, and a plurality of serving nodes, wherein each of the central nodes is connected to the forwarding router and at least one of the serving nodes, respectively; the connecting line from any one of the central nodes to the forwarding router and the connecting line from the central node to the serving node belong to the same operating network. The method comprises: transmitting, by a first serving node, a registration request carrying node information of the first serving node to a first central node connected to the first serving node; transmitting, by the first central node, a node registration notification carrying the node information of the first serving node to the forwarding router and other serving nodes, except the first serving node, connected to the first central node; transmitting, by the forwarding router, the node registration notification to other central nodes except the first central node; and transmitting, by the other central nodes, the node registration notification to respective serving nodes connected to the other central nodes, respectively, and correspondingly storing node information of the first central node and the node information of the first serving node.

In some embodiments, after the first serving node transmits the registration request carrying the node information of the first serving node to the first central node connected to the first serving node, the method further comprises: transmitting, by the first serving node, a heartbeat message to the first central node based on a first period.

In some embodiments, the method further comprises: transmitting, by the first central node, an offline notification of the first serving node to the other serving nodes and the forwarding router if the first central node does not receive the heartbeat message transmitted by the first serving node again within a first duration after the heartbeat message transmitted by the first serving node is received, wherein the first duration is longer than the first period; transmitting, by the forwarding router, the offline notification of the first serving node to the other central nodes; and transmitting, by the other central nodes, the offline notification of the first serving node to respective serving nodes connected to the other central nodes, respectively.

In some embodiments, after the other central nodes transmit the node registration notification to the respective serving nodes connected to the other central nodes, respectively, the method further comprises: receiving, by a second central node, a registration acknowledgment message of the first serving node transmitted by the serving node connected to the second central node, the second central node is any one of the other central nodes except the first central node; transmitting, by the second central node, the registration acknowledgement message of the first serving node to the forwarding router after receiving the registration acknowledgement message of the first serving node transmitted by all of the serving nodes connected to the second central node; transmitting, by the forwarding router, the registration acknowledgement message of the first serving node to the first central node after receiving the registration acknowledgement message of the first serving node transmitted by all of other central nodes except the first central node; and transmitting, by the first central node, the registration acknowledgement message of the first serving node to the first serving node after receiving the registration acknowledgement message of the first serving node transmitted by the forwarding router and all of the other serving nodes.

In some embodiments, the method further comprises: transmitting, by the second central node, the node registration notification to a second serving node again if the second central node does not receive the registration acknowledgement message of the first serving node transmitted by the second serving node within a second duration after a node registration notification of the first serving node is transmitted to the second serving node connected to the second central node.

In some embodiments, the method further comprises: transmitting, by the first central node, a synchronization request carrying the node information of all of the serving nodes connected to the first central node to the other central nodes through the forwarding router based on a second period; storing, by the other central nodes, the node information of all of the serving nodes connected to the first central node, and transmitting a synchronization acknowledgement message carrying the node information of all of the serving nodes connected to the other central nodes to the first central node through the forwarding router; and storing, by the first central node, the node information of all of the serving nodes connected to each of the other central nodes.

In some embodiments, the method further comprises: determining, by the first central node, the second central node corresponding to a second serving node when receiving a service execution request carrying the node information of the second serving node and transmitted by the first serving node, the second central node is any one of the other central nodes except the first central node; transmitting, by the first central node, the service execution request carrying the node information of the second serving node to the second central node through the forwarding router; transmitting, by the second central node, the service execution request to the second serving node; and executing, by the second serving node, a service execution process based on the service execution request.

In a second aspect, there is provided a system for processing a node registration notification. The system comprises a forwarding router, a plurality of central nodes, and a plurality of serving nodes, wherein each of the central nodes is connected to the forwarding router and at least one of the serving nodes, respectively; the connecting line from any one of the central nodes to the forwarding router and the connecting line from the central node to the serving node belong to the same operating network, wherein a first serving node is configured to transmit a registration request carrying node information of the first serving node to a first central node connected to the first serving node; the first central node is configured to transmit a node registration notification carrying the node information of the first serving node to the forwarding router and other serving nodes, except the first serving node, connected to the first central node; he forwarding router is configured to transmit the node registration notification to other central nodes except the first central node; and the other central nodes are configured to transmit the node registration notification to respective serving nodes connected to the other central nodes, respectively, and correspondingly store the node information of the first central node and the node information of the first serving node.

In some embodiments, the first serving node is further configured to transmit a heartbeat message to the first central node based on a first period after the first serving node transmits the registration request carrying the node information of the first serving node to the first central node connected to the first serving node.

In some embodiments, the first central node is further configured to transmit an offline notification of the first serving node to the other serving nodes and the forwarding router if the first central node does not receive the heartbeat message transmitted by the first serving node again within a first duration after the heartbeat message transmitted by the first serving node is received, wherein the first duration is longer than the first period; the forwarding router is further configured to transmit the offline notification of the first serving node to the other central nodes; and the other central nodes are further configured to transmit the offline notification of the first serving node to respective serving nodes connected to the other central nodes, respectively.

In some embodiments, a second central node is configured to receive a registration acknowledgment message of the first serving node transmitted by the serving node connected to the second central node after the other central nodes transmit the node registration notification to the respective serving nodes connected to the other central nodes, respectively, and transmit the registration acknowledgement message of the first serving node to the forwarding router after receiving the registration acknowledgement message of the first serving node transmitted by all of the serving nodes connected to the second central node, the second central node is any one of the other central nodes except the first central node; the forwarding router is further configured to transmit the registration acknowledgement message of the first serving node to the first central node after receiving the registration acknowledgement message of the first serving node transmitted by all of other central nodes except the first central node; and the first central node is further configured to transmit the registration acknowledgement message of the first serving node to the first serving node after receiving the registration acknowledgement message of the first serving node transmitted by the forwarding router and all of the other serving nodes.

In some embodiments, the second central node is further configured to transmit the node registration notification to a second serving node again if the second central node does not receive the registration acknowledgement message of the first serving node transmitted by the second serving node within a second duration after a node registration notification of the first serving node is transmitted to the second serving node connected to the second central node.

In some embodiments, the first central node is further configured to transmit a synchronization request carrying the node information of all of the serving nodes connected to the first central node to the other central nodes through the forwarding router based on a second period; the other central nodes are further configured to store the node information of all of the serving nodes connected to the first central node, and transmit a synchronization acknowledgement message carrying the node information of all of the serving nodes connected to the other central nodes to the first central node through the forwarding router; and the first central node is further configured to store the node information of all of the serving nodes connected to each of the other central nodes.

In some embodiments, the first serving node is further configured to determine a second central node corresponding to a second serving node when receiving a service execution request carrying the node information of the second serving node and transmitted by the first serving node, and transmit the service execution request carrying the node information of the second serving node to the second central node through the forwarding router, the second central node is any one of the other central nodes except the first central node; the second central node is further configured to transmit the service execution request to the second serving node; and the second serving node is further configured to execute a service execution process based on the service execution request.

The technical solution provided by the embodiment of the present disclosure brings the following benefits:

According to the embodiments of the present disclosure, in a distributed system, a plurality of serving nodes are connected to one central node, a plurality of central nodes are connected to one forwarding router, and the connecting line from one of the central nodes to the forwarding router and the connecting line from the central node to the serving node belong to the same operating network. In this case, when a plurality of serving nodes belonging to different operating networks communicate, it is possible to transceive communication messages through the central nodes and the forwarding router. Since the lines from the serving nodes to the forwarding router belong to the same operating network, the communication quality is better. Therefore, the difference in operating networks causes less impact on the communication between different serving nodes.

BRIEF DESCRIPTION OF THE DRAWINGS

To clearly describe the technical solution in the embodiments of the present disclosure, the drawings used in the description of the embodiments are briefly introduced. Apparently, the drawings described below only show some embodiments of the present disclosure, and other drawings can be obtained based on these drawings by those skilled in the art, without creative efforts.

DETAILED DESCRIPTION

In the process of implementing the present disclosure, the inventors have found that the prior art has at least the following problems: the serving nodes in the distributed system may be deployed in different areas, and network providers in different areas are generally different. However, the communication quality between the operating networks provided by different network providers is relatively poor. If the serving nodes and the central node in the distributed system use different operating networks (that is, they do not belong to the same network provider), the central node may not be able to discover the registration and exit of the serving nodes in the distributed system in time due to the poor communication quality, thereby greatly affecting the communication between the serving nodes.

To make the objects, technical solutions and advantages of the present disclosure clearer, the embodiments of the present disclosure are described in detail with reference to the accompanying drawings.

Figure 6:
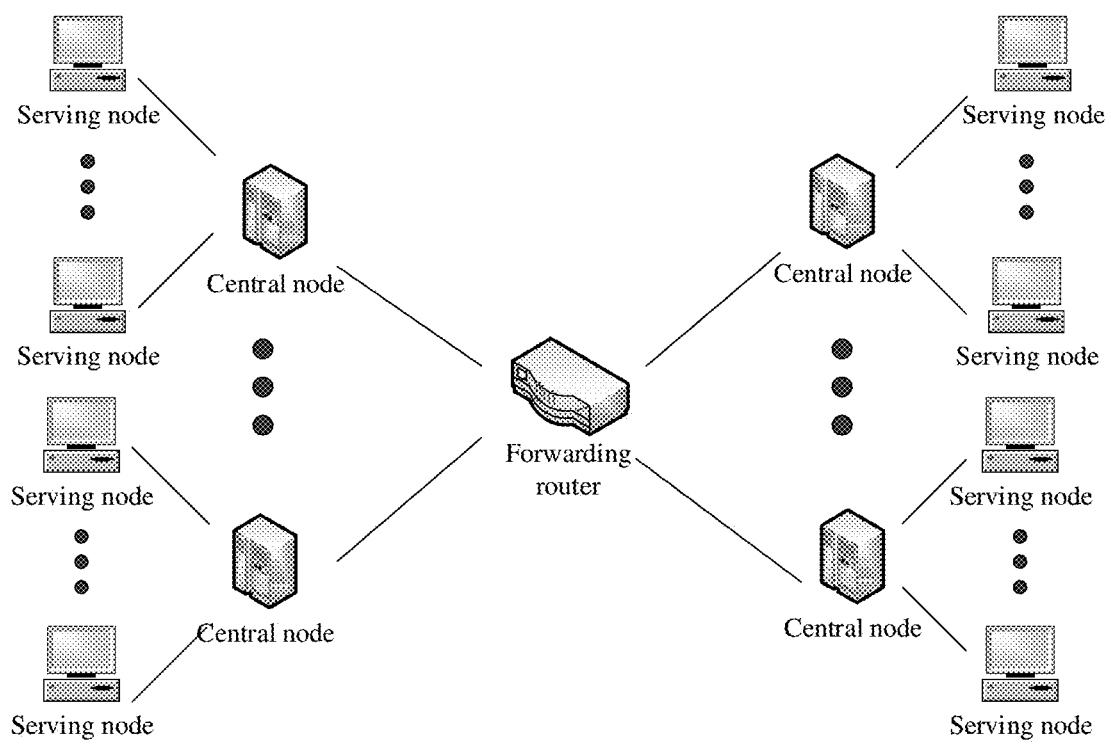
FIG. 6 is a structural block diagram of a distributed system provided by an embodiment of the present disclosure.

An embodiment of the present disclosure provides a method for processing a node registration notification. The method is applicable in a distributed system comprising a forwarding router, a plurality of central nodes, and a plurality of serving nodes, wherein each of the central nodes is connected to the forwarding router and at least one of the serving nodes, respectively, and the connecting line from any one of the central nodes to the forwarding router and the connecting line from the any one of the central nodes to the serving node belong to the same operating network. The execution body of the method is a server. The forwarding router, the central node, and the serving node in this embodiment may be a forwarding router server, a central node server, and a serving node server, respectively. Wherein, the central node server and the serving node server may be collectively referred to as node servers. The serving server may be a server for receiving service execution requests transmitted by a service client. The node server may be a server for networking among a plurality of serving servers. The central node is a management server for a plurality of serving nodes. The forwarding router is a forwarding server connecting a plurality of central nodes. The system framework is as shown in FIG. 6.

Figure 1:
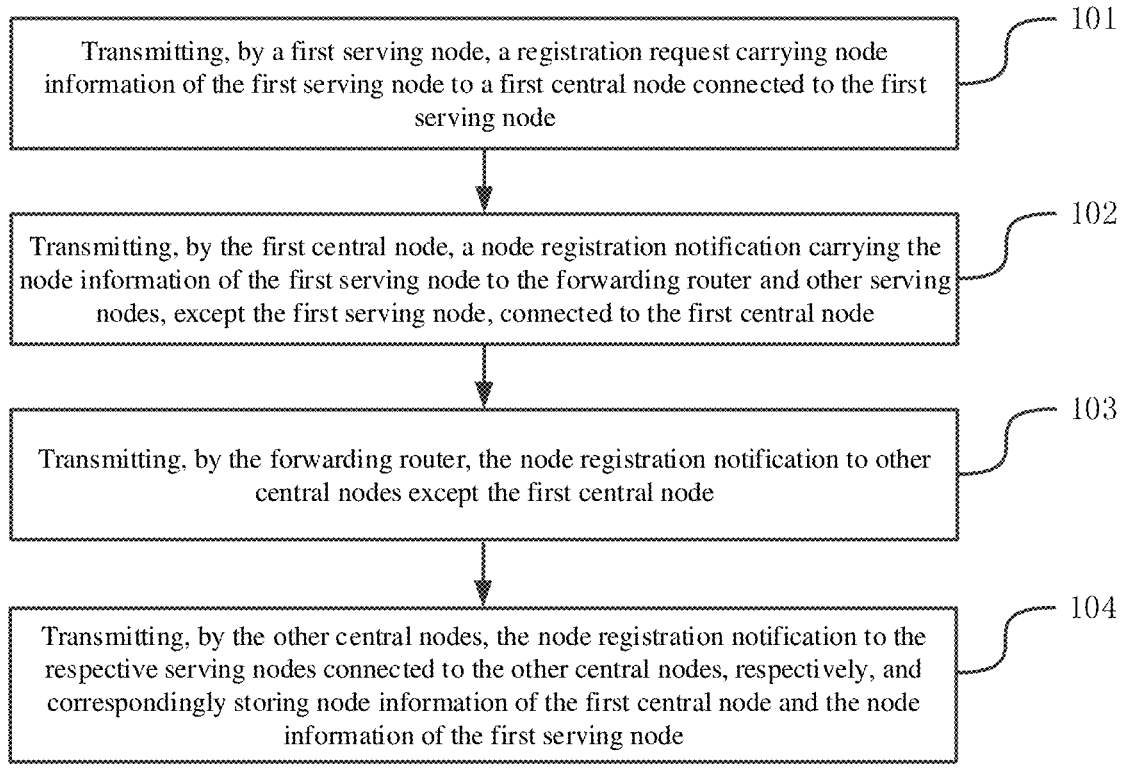
FIG. 1 is a flowchart of a method for processing a node registration notification provided by an embodiment of the present disclosure.

The processing flow shown in FIG. 1 will be described in detail below with reference to specific embodiments, and the content may be described as follows.

In step 101, a first serving node transmits a registration request carrying node information of the first serving node to a first central node connected to the first serving node.

During implementation, when a service provider needs to add a service server (that is, the first serving node) to a distributed system, the central node (i.e., the first central node) corresponding to the service server may be first determined according to the line where the service server is located. The service provider may further write the node information such as the IP and port number of the first central node to the first serving node, so that the first serving node can establish a communication connection with the first central node according to the node information of the first central node through a TCP protocol. Then, the first serving node may transmit a registration request carrying the node information of the first serving node to the first central node.

In step 102, the first central node transmits a node registration notification carrying the node information of the first serving node to the forwarding router and other serving nodes, except the first serving node, connected to the first central node.

During implementation, after the first serving node transmits a registration request to the first central node, the first central node may generate a node registration notification of the first serving node. The node registration notification may carry the node information of the first serving node. Then, the first central node may transmit the node registration notification of the first serving node to the forwarding router and other serving nodes, except the first serving node, connected to the first central node.

In addition, the first central node may number the first serving node according to a numbering rule, that is, assign an ID, after receiving the registration request transmitted by the first serving node. In this way, the node information of the first serving node carried in the communication message between subsequent servers may include the ID of the first serving node. It should be guaranteed that the IDs assigned by all of the central nodes to the serving nodes are non-repetitive, that is, the ID of each serving node is unique. Here, a feasible numbering rule is provided. First, the n central nodes are numbered from 1 to n. For the central node numbered m, where 1≤m≤n, and the IDs of the serving nodes connected to the central node numbered m may be m+n, m+2n, m+3n . . . . Thus, when the central nodes increase or decrease, numbering adjustment may be completed by simply changing the value of n in the numbering rule. Meanwhile, the first central node may transmit the node information stored therein of all of the serving nodes in the distributed system to the first serving node, such that the first serving node stores these pieces of node information. Thus, the first serving node can interact with the corresponding serving nodes according to these pieces of node information during the subsequent service execution process.

In step 103, the forwarding router transmits the node registration notification to the central nodes except the first central node.

During implementation, the forwarding router may be configured with a plurality of IP addresses, each IP address serves different operating networks. That is, the forwarding router supports a plurality of lines and is connected to the corresponding central node through the line. Correspondence here means that the line of the central node and this line belong to the same operating network. In this way, the forwarding router can receive the node registration notification of the first serving node transmitted by the first central node via a first IP address. Then, the forwarding router can forward the node registration notification to the other central nodes connected the forwarding router except the first central node through other IP addresses, respectively.

In step 104, the other central nodes transmit the node registration notification to the respective serving nodes connected to the other central nodes, respectively, and correspondingly store node information of the first central node and the node information of the first serving node.

During implementation, the other central nodes, except the first central node, connected to the forwarding router may receive the node registration notification of the first serving node transmitted by the forwarding router. Then, each of the other central nodes may transmit the node registration notification to the respective serving nodes connected to the other central nodes. Meanwhile, the other central nodes may acquire the node information of the first serving node and the node information of the first central node carried in the node registration notification, and further store the two pieces of node information correspondingly.

The serving nodes connected to the other central nodes may, after receiving the node registration notification of the first serving node transmitted by the respective central nodes connected to the serving nodes, acquire the node information of the first serving node carried in the node registration notification and then store the node information locally. Similarly, in step 102, the other serving nodes connected to the first central node may receive the node registration notification of the first serving node transmitted by the first central node, and may acquire the node information of the first serving node carried in the node registration notification, then store the node information locally, and label the operating state of the first serving node as an online state.

In some embodiments, the first serving node may periodically notify the first central node of its operation state, after transmitting the registration request to the first central node and completing the registration. The corresponding process may be as follows: the first serving node transmits a heartbeat message to the first central node based on a first period.

The heartbeat message may be a message for assisting a message receiver in learning of the operation state of a message sender in time.

During implementation, the first serving node may transmit the heartbeat message to the first central node according to the first period after completing the registration at the first central node (that is, the first serving node joins the distributed system). The heartbeat message may carry the node information of the first serving node. In this case, the first central node may acquire the operation state of the first serving node in time according to the received heartbeat message.

Figure 2:
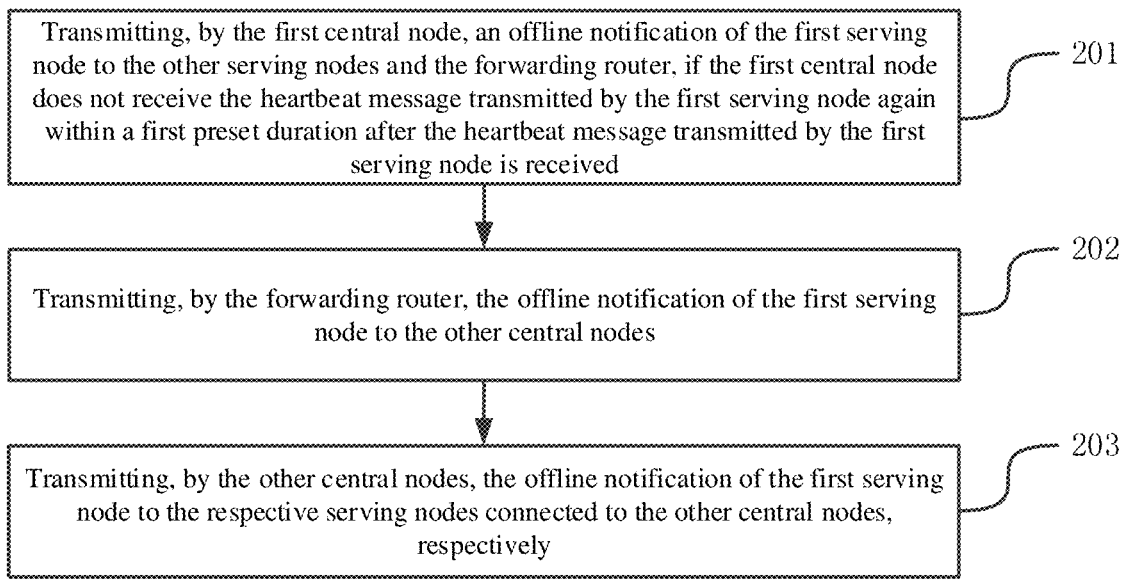
FIG. 2 is a flowchart of a method for processing a node registration notification provided by an embodiment of the present disclosure.

In some embodiments, if the first central node does not receive the heartbeat message transmitted by the first serving node for a long time, offline processing of the first serving node may be performed. As shown in FIG. 2, the corresponding processing flow may be as follows:

In step 201, the first central node transmits an offline notification of the first serving node to the other serving nodes and the forwarding router, if the first central node does not receive the heartbeat message transmitted by the first serving node again within a first duration after the heartbeat message transmitted by the first serving node is received.

The first duration is longer than the first period.

During implementation, the first serving node may transmit the heartbeat message to the first central node based on the first period after joining the distributed system. However, if the first central node does not receive the heartbeat message transmitted by the first serving node again within the first duration after receiving the heartbeat message once, the first serving node may be determined to be in an offline state, and then the offline notification of the first serving node may be transmitted to the forwarding router and other serving nodes connected to the first central node. The offline notification may carry the node information of the first serving node. It may be understood that the offline of the first serving node includes active offline of a service provider or passive offline caused by a malfunction.

In step 202, the forwarding router transmits the offline notification of the first serving node to the other central nodes.

During implementation, the forwarding router may receive the offline notification of the first serving node transmitted by the first central node, and then transmit the offline notification to the other central nodes connected to the forwarding router.

In step 203, the other central nodes transmit the offline notification of the first serving node to the respective serving nodes connected to the other central nodes, respectively.

During implementation, the other central nodes connected to the forwarding router except the first central node may receive the offline notification of the first serving node transmitted by the forwarding router, and then transmit the offline notification to the respective serving nodes connected to the other central nodes. In this way, the serving nodes may label the operating state of the first serving node as an offline state after receiving the offline notification, that is, stop the current service execution processing and reject the subsequent service execution processing related to the first serving node. Similarly, the processing of the other serving nodes connected to the first central node in step 201 is the same as the above processing.

It should be noted that, after the first serving node is offline, if it wants to join the distributed system again, the online processing is basically the same as the processing from step 101 to step 104, and details will not be described herein again.

Figure 5:
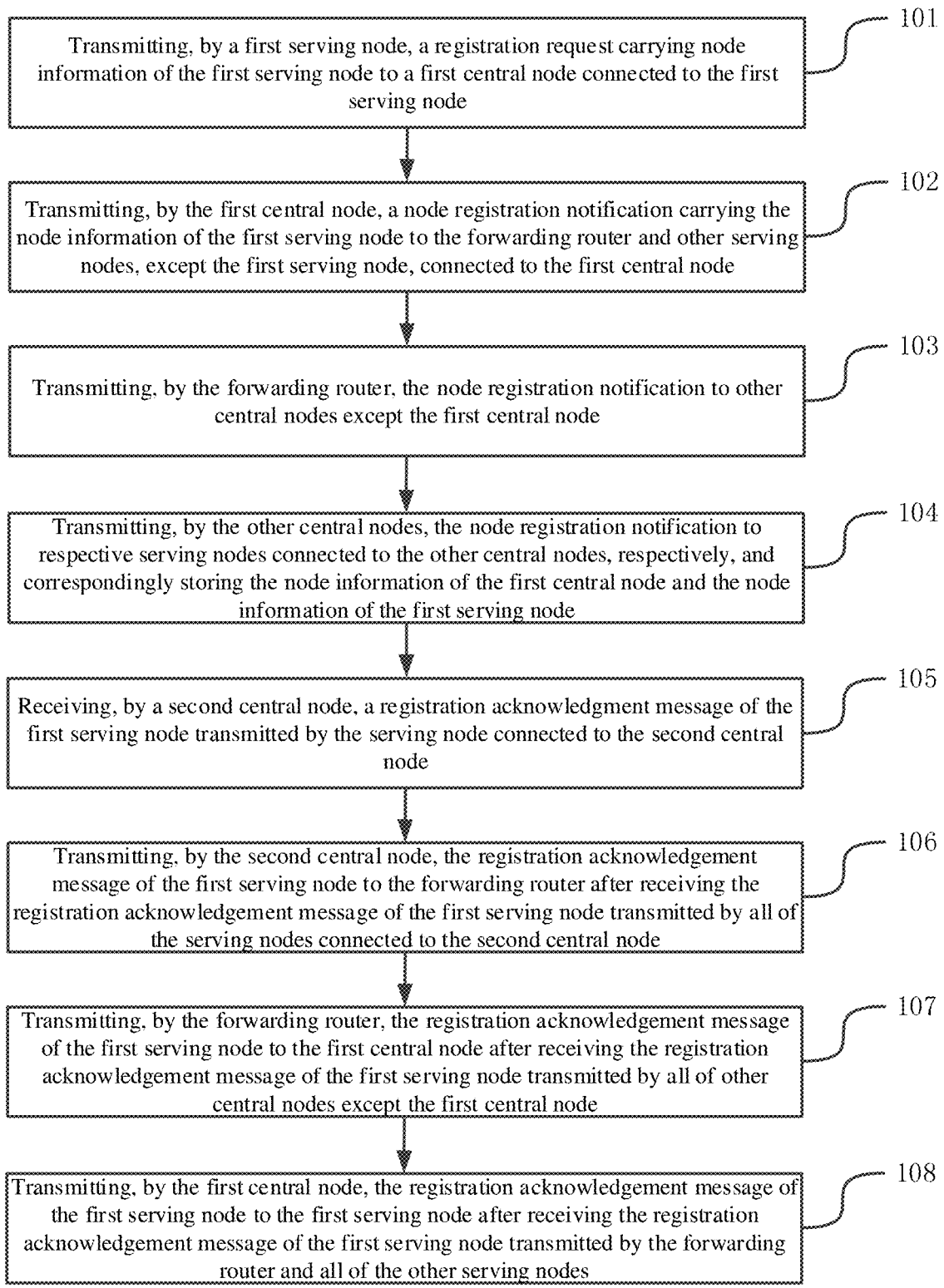
FIG. 5 is a flowchart of a method for processing a node registration notification provided by an embodiment of the present disclosure.

In some embodiments, after step 104, the central nodes and the serving nodes may return the registration acknowledgement message after receiving the node registration notification of the first serving node. As shown in FIG. 5, the corresponding processing flow may be as follows.

In step 105, the second central node receives the registration acknowledgement message of the first serving node transmitted by a serving node connected to the second central node, the second central node is any one of the other central nodes except the first central node.

During implementation, if the serving node receives the node registration notification after the second central node transmits the node registration notification of the first serving node to the serving node connected to the second central node, the serving node may return the registration acknowledgement message of the first serving node to the second central node. Correspondingly, the second central node may receive the registration acknowledgement message. Similarly, the other serving nodes, except the first serving node, connected to the first central node may also return the registration acknowledgement message of the first serving node to the first central node after receiving the node registration notifiction of the first serving node transmitted by the first central node.

In step 106, the second central node transmits the registration acknowledgement message of the first serving node to the forwarding router after receiving the registration acknowledgement message of the first serving node transmitted by all of the serving nodes connected to the second central node.

In step 107, the forwarding router transmits the registration acknowledgement message of the first serving node to the first central node after receiving the registration acknowledgement message of the first serving node transmitted by all of the other central nodes except the first central node.

In step 108, the first central node transmits the registration acknowledge message of the first serving node to the first serving node after receiving the registration acknowledgement message of the first serving node transmitted by the forwarding router and all of the other serving nodes.

During implementation, the first central node may transmit the registration acknowledgement message to the first serving node after receiving the registration acknowledgement message of the first serving node transmitted by the forwarding router and all of the other serving nodes connected to the first central node. The first serving node may be informed that this registration is successful after receiving the registration acknowledgement message.

In some embodiments, if a central node does not receive the registration acknowledgement message of the first serving node returned by a serving node connected to the central node, the serving node may not have received the previous node registration notification, and the central node needs to transmit the node registration notification again. The corresponding processing may be as follows: the second central node transmits the node registration notification to the second serving node again, if the second central node does not receive the registration acknowledgement message of the first serving node transmitted by the second serving node within a second duration after the node registration notification of the first serving node is transmitted to the second serving node connected to the second central node.

During implementation, the second central node may transmit the node registration notification to the second serving node again, if the second central node has never received the registration acknowledgement message of the first serving node returned by the second serving node within the second duration after the second central node transmits the node registration notification of the first serving node to the second serving node connected to the second central node. Further, if the second central node has never received the registration acknowledgement message returned by the second serving node after transmitting the node registration notification to the second serving node for a plurality of times, the second central node may stop transmitting the node registration notification, and detect the connection state of the second central node and the second serving node, and may send an alarm message.

Figure 3:
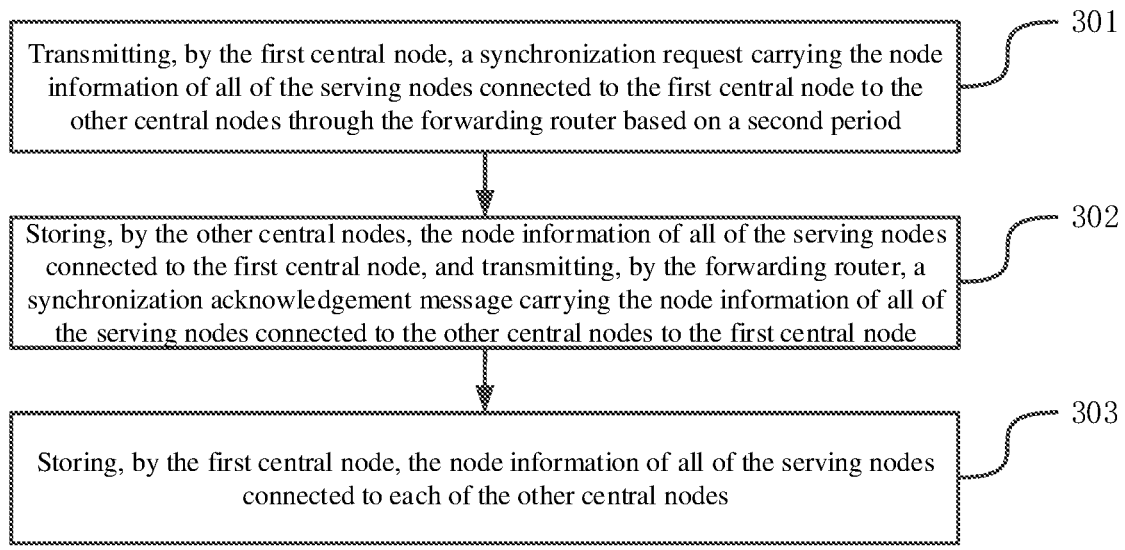
FIG. 3 is a flowchart of a method for processing a node registration notification provided by an embodiment of the present disclosure.

In some embodiments, a plurality of central nodes may periodically synchronize data. As shown in FIG. 3, the corresponding processing flow may be as follows:

In step 301, the first central node transmits a synchronization request carrying the node information of all of the serving nodes connected to the first central node to the other central nodes through the forwarding router based on the second period.

During implementation, prior to synchronization, the first central node may first detect operating states of all of the serving nodes connected to the first central node, update the locally stored node information of all of the serving nodes connected to the first central node, and then generate the synchronization request carrying the node information of all of the serving nodes connected to the first central node. Thus, the first central node may transmit the synchronization request to the other central nodes through the forwarding router. It is worth mentioning that the synchronization request carries the node information of the serving nodes connected to the first central node only, and does not carry the node information of the serving nodes connected to other central nodes.

In step 302, the other central nodes store the node information of all of the serving nodes connected to the first central node, and transmit a synchronization acknowledgement message carrying the node information of all of the serving nodes connected to the other central nodes to the first central node through the forwarding router.

During implementation, the other central nodes may receive the synchronization request transmitted by the first central node through the forwarding router, then acquire the node information of all of the serving nodes connected to the first central node carried in the synchronization request, and further store these pieces of node information locally. That is, the locally stored node information of all of the serving nodes corresponding to the first central node is updated. Meanwhile, a synchronization acknowledgement message carrying the node information of all of the serving nodes connected to the other central nodes respectively may be transmitted to the first central node through the forwarding router. Specifically, the synchronization acknowledgement message transmitted by the second central node to the first central node carries the node information of all of the serving nodes connected to the second central node.

In step 303, the first central node stores the node information of all of the serving nodes connected to each of the other central nodes.

During implementation, the first central node may receive the synchronization acknowledgement message transmitted by the other central nodes through the forwarding router, and thus acquire the node information of the serving node carried in the synchronization acknowledgement message, and then correspondingly store the node information of the serving node and the node information of the central node connected to the serving node. It can be known that each central node may store the node information of the serving node correspondingly with the node information of the respective central node connected to the serving node. For example, there are three central nodes, seven serving nodes connected to the first central node, eight serving nodes connected to the second central node, and nine serving nodes connected to the third central node. In this case, the node information of the twenty-four serving nodes is stored in the each of three central nodes. When the first central node initiates synchronization, the synchronization request carries node information of seven serving nodes. The synchronization acknowledgement message returned by the second central node carries node information of eight serving nodes.

The synchronization acknowledgement message returned by the third central node carries node information of nine serving nodes.

Figure 4:
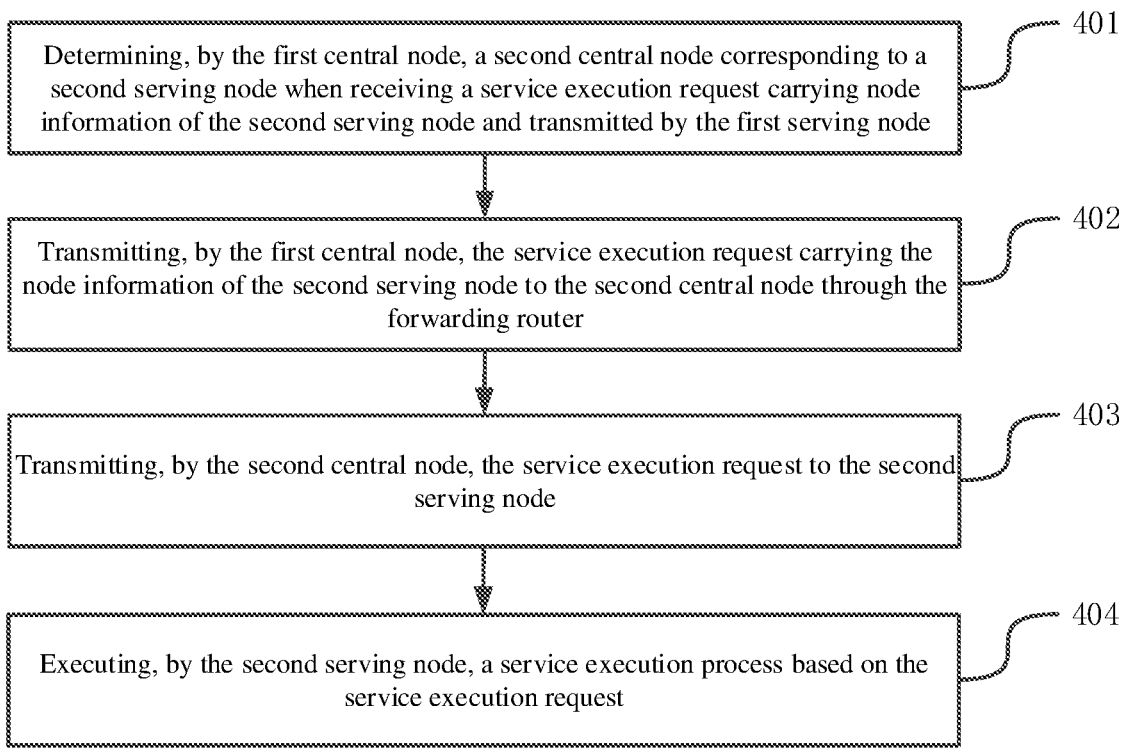
FIG. 4 is a flowchart of a method for processing a node registration notification provided by an embodiment of the present disclosure.

In some embodiments, the present embodiment further discloses a processing flow for executing a service request. As shown in FIG. 4, the processing flow may be as follows.

In step 401, the first central node determines the second central node corresponding to the second serving node when receiving a service execution request carrying the node information of the second serving node and transmitted by the first serving node, the second central node is any one of the other central nodes except the first central node.

During implementation, after receiving the service request transmitted by a service client, the first serving node may first perform part of business services supported locally, then determine the node server (such as the second serving node) corresponding to other business services, and further transmit the service execution request carrying the node information of the second serving node to the first central node. After receiving the service execution request, the first central node may acquire the node information of the second serving node carried in the service execution request, and then determine the second central node connected to the second serving node.

In step 402, the first central node transmits the service execution request carrying the node information of the second serving node to the second central node through the forwarding router.

In step 403, the second central node transmits the service execution request to the second serving node.

In step 404, the second serving node performs service execution processing based on the service execution request.

According to the embodiment of the present disclosure, in a distributed system, a plurality of serving nodes are connected to the corresponding central node, a plurality of central nodes are connected to the forwarding router, and the connecting line from each central node to the forwarding router and the connecting line from the central node to the serving node belong to the same operating network. Thus, when a plurality of serving nodes belonging to different operating networks communicate, the serving nodes can transceive communication messages through the central nodes and the forwarding router. Since the lines from the serving nodes to the forwarding router belong to the same operating network, the communication quality is better. Therefore, the difference among operating networks causes a less impact on the communication between serving nodes.

Based on the same technical concept, an embodiment of the present disclosure further provides a system for processing a node registration notification. The system includes a forwarding router, a plurality of central nodes, and a plurality of serving nodes. Each of the central nodes is connected to the forwarding router and at least one of the serving nodes, respectively. The connecting line from any one of the central nodes to the forwarding router and the connecting line from the central node to the serving node belong to the same operating network.

A first serving node is configured to transmit a registration request carrying node information of the first serving node to a first central node connected to the first serving node. The first central node is configured to transmit a node registration notification carrying the node information of the first serving node to the forwarding router and other serving nodes, except the first serving node, connected to the first central node. The forwarding router is configured to transmit the node registration notification to the other central nodes except the first central node. The other central nodes are configured to transmit the node registration notification to respective serving nodes connected to the other central nodes, respectively, and correspondingly store the node information of the first central node and the node information of the first serving node.

In some embodiments, the first serving node is further configured to transmit a heartbeat message to the first central node based on a first period after the first serving node transmits the registration request carrying the node information of the first serving node to the first central node connected to the first serving node.

In some embodiments, the first central node is further configured to transmit an offline notification of the first serving node to the other serving nodes and the forwarding router if the first central node does not receive the heartbeat message transmitted by the first serving node again within a first duration after the heartbeat message transmitted by the first serving node is received, wherein the first duration is longer than the first period. The forwarding router is further configured to transmit the offline notification of the first serving node to the other central nodes. The other central nodes are further configured to transmit the offline notification of the first serving node to respective serving nodes connected to the other central nodes, respectively. In some embodiments, the first central node is further configured to transmit an offline notification of the first serving node to the other serving nodes and the forwarding router if the first central node does not receive the heartbeat message transmitted by the first serving node again within a first duration after the heartbeat message transmitted by the first serving node is received, wherein the first duration is longer than the first period. The forwarding router is further configured to transmit the offline notification of the first serving node to the other central nodes. The other central nodes are further configured to transmit the offline notification of the first serving node to respective serving nodes connected to the other central nodes, respectively.

In some embodiments, a second central node is configured to receive a registration acknowledgment message of the first serving node transmitted by the serving node connected to the second central node after the other central nodes transmit the node registration notification to the respective serving nodes connected to the other central nodes, respectively, and transmit the registration acknowledgement message of the first serving node to the forwarding router after receiving the registration acknowledgement message of the first serving node transmitted by all of the serving nodes connected to the second central node. The second central node is any one of the other central nodes except the first central node. The forwarding router is further configured to transmit the registration acknowledgement message of the first serving node to the first central node after receiving the registration acknowledgement message of the first serving node transmitted by all of other central nodes except the first central node. The first central node is further configured to transmit the registration acknowledgement message of the first serving node to the first serving node after receiving the registration acknowledgement message of the first serving node transmitted by the forwarding router and all of the other serving nodes.

In some embodiments, the second central node is further configured to transmit the node registration notification to the second serving node again if the second central node does not receive the registration acknowledgement message of the first serving node transmitted by the second serving node within a second duration after the node registration notification of the first serving node is transmitted to the second serving node connected to the second central node.

In some embodiments, the first central node is further configured to transmit a synchronization request carrying the node information of all of the serving nodes connected to the first central node to the other central nodes through the forwarding router based on the second period. The other central nodes are further configured to store the node information of all of the serving nodes connected to the first central node, and transmit a synchronization acknowledgement message carrying the node information of all of the serving nodes connected to the other central nodes to the first central node through the forwarding router. The first central node is further configured to store the node information of all of the serving nodes connected to each of the other central nodes.

In some embodiments, the first serving node is further configured to determine the second central node corresponding to the second serving node when receiving a service execution request carrying the node information of the second serving node and transmitted by the first serving node, and transmit the service execution request carrying the node information of the second serving node to the second central node through the forwarding router. The second central node is any one of the other central nodes except the first central node. The second central node is further configured to transmit the service execution request to the second serving node. The second serving node is further configured to execute a service execution process based on the service execution request.

According to the embodiment of the present disclosure, in a distributed system, a plurality of serving nodes are connected to the corresponding central node, a plurality of central nodes are connected to the forwarding router, and the connecting line from each central node to the forwarding router and the connecting line from the central node to a serving node belong to the same operating network. Thus, when a plurality of serving nodes belonging to different operating networks communicate, the serving nodes can transceive communication messages through the central nodes and the forwarding router. Since the lines from the serving nodes to the forwarding router belong to the same operating network, the communication quality is better. Therefore, the difference among operating networks causes less impact on the communication between serving nodes.

Figure 7:
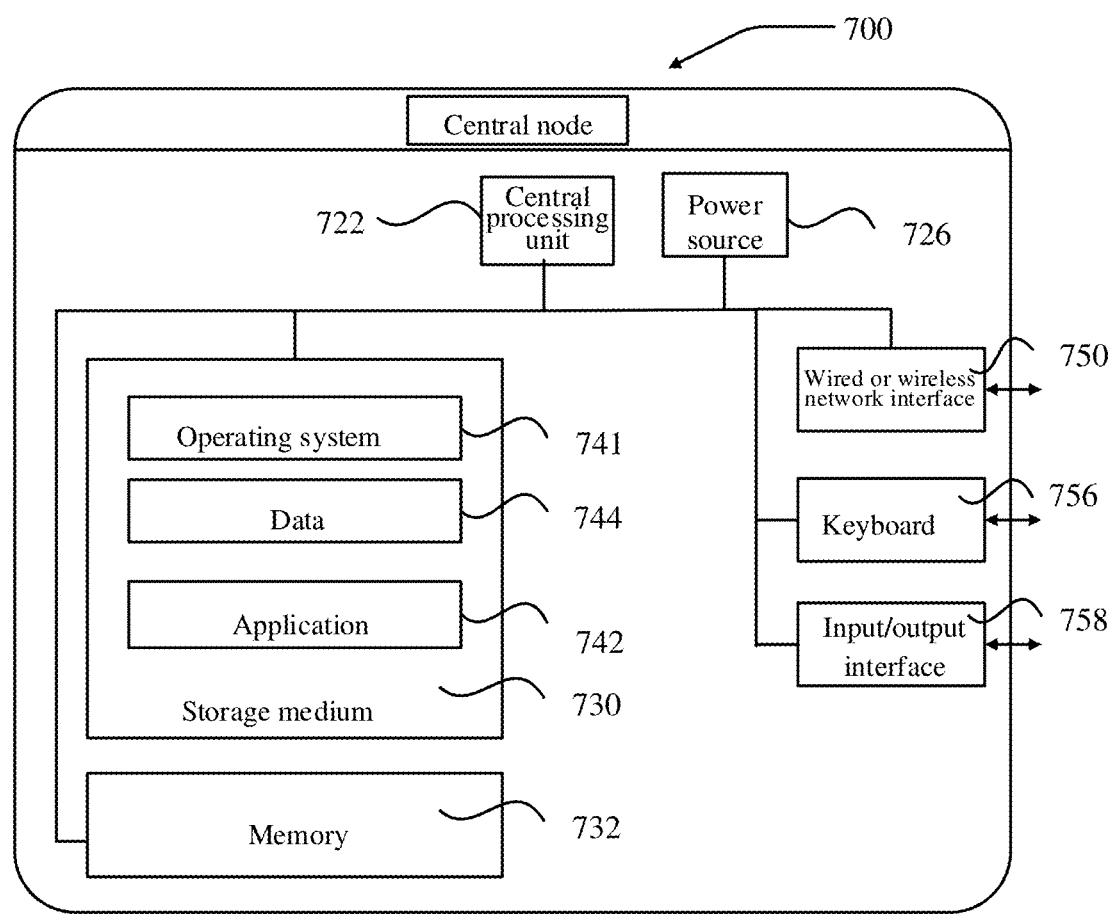
FIG. 7 is a schematic structural diagram of a server provided by an embodiment of the present disclosure.

FIG. 7 is a schematic structural diagram of a central node provided by an embodiment of the present disclosure. The central node 700 may have a relatively big difference with the difference in configuration or performance. The central node 700 may include one or more central processing units (CPUs) 722 (e.g., one or more processors), a memory 732, and one or more storage media 730 (i.e., one or more massive storage devices) that store application 742 or data 744. The memory 732 and the storage medium 730 may adopt transient storage or persistent storage. Programs stored in the storage medium 730 may include one or more modules (not shown), each of which may include a series of instruction operations for the server. Furthermore, the central processing unit 722 may be configured to communicate with the storage medium 730, and execute a series of instruction operations in the storage medium 730 at the central node 700.

The central node 700 may further include one or more power sources 726, one or more wired or wireless network interfaces 750, one or more input/output interfaces 758, one or more keyboards 756, and/or, one or more operating systems 741, such as Windows Server™, Mac OS X™, Unix™, Linux™, FreeBSD™ or the like.

The central node 700 may include a memory and one or more programs stored in the memory and configured to be executed by the one or more central processing units to perform the related processing of the central node (which may be the first central node or other central nodes) in various embodiments.

In addition, the structures of the forwarding router and the serving node are substantially the same as that of the central node, and details will not be described herein.

It should be understood by those skilled in the art that, all or part of the steps of the above embodiments may be implemented through a hardware, or through a hardware instructed by programs. The programs may be stored in a computer-readable storage medium which may be a read-only memory, a magnetic disk or an optical disk.

The foregoing descriptions are only preferred embodiments of the present disclosure, and do not intend to limit the present disclosure. Any amendments, equivalent substitution and modification that fall within the spiritual and principle of the present disclosure should be embraced by the protection scope of the present disclosure.

What is claimed is:

1. A method for processing a node registration notification, wherein the method is applicable in a distributed system comprising a forwarding router, n central nodes, and a plurality of serving nodes, wherein each of the central nodes is connected to the forwarding router and at least one of the serving nodes, respectively; the forwarding router is configured with a plurality of IP addresses, and the plurality of IP addresses serve different operating networks; a connecting line from any one of the central nodes to the forwarding router and a connecting line from the any one of the central nodes to the serving node belong to the same operating network; the forwarding router communicates, through one of the IP addresses, with a central node belonging to an operation network served by the one of the IP addresses; the method comprising:

transmitting, by a first serving node, a registration request carrying node information of the first serving node to a first central node connected to the first serving node;

assigning, by the first central node, an ID to the first service node as M+kn, wherein the first central node is numbered m in the n central nodes, and the first central node has assigned k−1 ID to k−1 service nodes, $1 \leq m \leq n$ and $1 \leq k$;

transmitting, by the first central node, a node registration notification carrying the node information of the first serving node to the forwarding router and other serving nodes, except the first serving node, connected to the first central node, wherein the node information of the first service node comprises the ID of the first service node;

transmitting, by the forwarding router, the node registration notification to other central nodes except the first central node; and transmitting, by the other central nodes, the node registration notification to the respective serving nodes connected to the other central nodes, respectively, and correspondingly storing node information of the first central node and the node information of the first serving node.

2. The method according to claim 1, wherein after the first serving node transmits the registration request carrying the node information of the first serving node to the first central node connected to the first serving node, the method further comprises:

transmitting, by the first serving node, a heartbeat message to the first central node based on a first period.

3. The method according to claim 2, further comprising:

transmitting, by the first central node, an offline notification of the first serving node to the other serving nodes and the forwarding router, if the first central node does not receive the heartbeat message transmitted by the first serving node again within a first duration after the heartbeat message transmitted by the first serving node is received, wherein the first duration is longer than the first period;

transmitting, by the forwarding router, the offline notification of the first serving node to the other central nodes; and transmitting, by the other central nodes, the offline notification of the first serving node to the respective serving nodes connected to the other central nodes, respectively.

4. The method according to claim 1, wherein after the other central nodes transmit the node registration notification to the respective serving nodes connected to the other central nodes, respectively, the method further comprises:

receiving, by a second central node, a registration acknowledgment message of the first serving node transmitted by the serving node connected to the second central node, the second central node is any one of the other central nodes except the first central node;

transmitting, by the second central node, the registration acknowledgement message of the first serving node to the forwarding router after receiving the registration acknowledgement message of the first serving node transmitted by all of the serving nodes connected to the second central node;

transmitting, by the forwarding router, the registration acknowledgement message of the first serving node to the first central node after receiving the registration acknowledgement message of the first serving node transmitted by all of other central nodes except the first central node; and transmitting, by the first central node, the registration acknowledgement message of the first serving node to the first serving node after receiving the registration acknowledgement message of the first serving node transmitted by the forwarding router and all of the other serving nodes.

5. The method according to claim 4, further comprising:

transmitting, by the second central node, the node registration notification to a second serving node again if the second central node does not receive the registration acknowledgement message of the first serving node transmitted by the second serving node within a second duration after the node registration notification of the first serving node is transmitted to the second serving node connected to the second central node.

6. The method according to claim 1, further comprising:

transmitting, by the first central node, a synchronization request carrying the node information of all of the serving nodes connected to the first central node to the other central nodes through the forwarding router based on a second period;

storing, by the other central nodes, the node information of all of the serving nodes connected to the first central node, and transmitting, by the forwarding router, a synchronization acknowledgement message carrying the node information of all of the serving nodes connected to the other central nodes to the first central node; and storing, by the first central node, the node information of all of the serving nodes connected to each of the other central nodes.

7. The method according to claim 1, further comprising:

determining, by the first central node, a second central node corresponding to a second serving node when receiving a service execution request carrying node information of the second serving node and transmitted by the first serving node, the second central node is any one of the other central nodes except the first central node;

transmitting, by the first central node, the service execution request carrying the node information of the second serving node to the second central node through the forwarding router;

transmitting, by the second central node, the service execution request to the second serving node; and executing, by the second serving node, a service execution process based on the service execution request.

8. A system for processing a node registration notification, comprising a forwarding router, n central nodes, and a plurality of serving nodes, wherein each of the central nodes is connected to the forwarding router and at least one of the serving nodes, respectively; the forwarding router is configured with a plurality of IP addresses, and the plurality of IP addresses serve different operating networks; a connecting line from any one of the central nodes to the forwarding router and a connecting line from the any one of the central node to the serving node belong to the same operating network; the forwarding router communicates, through one of the IP addresses, with a central node belonging to an operation network served by the one of the IP addresses, wherein a first serving node is configured to transmit a registration request carrying node information of the first serving node to a first central node connected to the first serving node;

the first central node is configured to assign an ID to the first service node as M+kn, wherein the first central node is numbered m in the n central nodes, and the first central node has assigned k−1 ID to k−1 service nodes, 1≤m≤n and 1≤k;

the first central node is configured to transmit a node registration notification carrying the node information of the first serving node to the forwarding router and other serving nodes, except the first serving node, connected to the first central node, wherein the node information of the first service node comprises the ID of the first service node;

the forwarding router is configured to transmit the node registration notification to other central nodes except the first central node; and the other central nodes are configured to transmit the node registration notification to respective serving nodes connected to the other central nodes, respectively, and correspondingly store the node information of the first central node and the node information of the first serving node.

9. The system according to claim 8, wherein the first serving node is further configured to transmit a heartbeat message to the first central node based on a first period after the first serving node transmits the registration request carrying the node information of the first serving node to the first central node connected to the first serving node.

10. The system according to claim 9, wherein the first central node is further configured to transmit an offline notification of the first serving node to the other serving nodes and the forwarding router if the first central node does not receive the heartbeat message transmitted by the first serving node again within a first duration after the heartbeat message transmitted by the first serving node is received, wherein the first duration is longer than the first period;
the forwarding router is further configured to transmit the offline notification of the first serving node to the other central nodes; and
the other central nodes are further configured to transmit the offline notification of the first serving node to respective serving nodes connected to the other central nodes, respectively.

11. The system according to claim 8, wherein a second central node is configured to receive a registration acknowledgment message of the first serving node transmitted by the serving node connected to the second central node after the other central nodes transmit the node registration notification to the respective serving nodes connected to the other central nodes, respectively, and transmit the registration acknowledgement message of the first serving node to the forwarding router after receiving the registration acknowledgement message of the first serving node transmitted by all of the serving nodes connected to the second central node, the second central node is any one of the other central nodes except the first central node;
the forwarding router is further configured to transmit the registration acknowledgement message of the first serving node to the first central node after receiving the registration acknowledgement message of the first serving node transmitted by all of other central nodes except the first central node; and
the first central node is further configured to transmit the registration acknowledgement message of the first serving node to the first serving node after receiving the registration acknowledgement message of the first serving node transmitted by the forwarding router and all of the other serving nodes.

12. The system according to claim 11, wherein the second central node is further configured to transmit the node registration notification to a second serving node again if the second central node does not receive the registration acknowledgement message of the first serving node transmitted by the second serving node within a second duration after the node registration notification of the first serving node is transmitted to the second serving node connected to the second central node.

13. The system according to claim 8, wherein the first central node is further configured to transmit a synchronization request carrying the node information of all of the serving nodes connected to the first central node to the other central nodes through the forwarding router based on a second period;
the other central nodes are further configured to store the node information of all of the serving nodes connected to the first central node, and transmit a synchronization acknowledgement message carrying the node information of all of the serving nodes connected to the other central nodes to the first central node through the forwarding router; and
the first central node is further configured to store the node information of all of the serving nodes connected to each of the other central nodes.

14. The system according to claim 8, wherein, the first serving node is further configured to determine a second central node corresponding to a second serving node when receiving a service execution request carrying node information of the second serving node and transmitted by the first serving node, and transmit the service execution request carrying the node information of the second serving node to the second central node through the forwarding router, the second central node is any one of the other central nodes except the first central node;
the second central node is further configured to transmit the service execution request to the second serving node; and
the second serving node is further configured to execute a service execution process based on the service execution request.

\* \* \* \* \*